(12) United States Patent
De Groot

(10) Patent No.: US 6,989,905 B2
(45) Date of Patent: *Jan. 24, 2006

(54) PHASE GAP ANALYSIS FOR SCANNING INTERFEROMETRY

(75) Inventor: Peter J. De Groot, Middletown, CT (US)

(73) Assignee: Zygo Corporation, Middlefield, CT (US)

(*) Notice: Subject to any disclaimer, the term of this patent is extended or adjusted under 35 U.S.C. 154(b) by 342 days.

This patent is subject to a terminal disclaimer.

(21) Appl. No.: 10/429,175

(22) Filed: May 2, 2003

(65) Prior Publication Data

US 2004/0027585 A1 Feb. 12, 2004

Related U.S. Application Data

(60) Provisional application No. 60/377,301, filed on May 2, 2002.

(51) Int. Cl.
*G01B 9/02* (2006.01)

(52) U.S. Cl. ........................... 356/516; 356/497
(58) Field of Classification Search ............. 356/497, 356/479, 511, 516
See application file for complete search history.

(56) References Cited

U.S. PATENT DOCUMENTS

| | | | |
|---|---|---|---|
| 5,398,113 A | 3/1995 | de Groot | |
| 5,953,124 A | 9/1999 | Deck | |
| 6,195,168 B1 | 2/2001 | De Lega et al. | |
| 6,493,093 B2 | 12/2002 | Harasaki et al. | |
| 6,775,006 B2 * | 8/2004 | Groot et al. | 356/497 |
| 2002/0135775 A1 | 9/2002 | De Groot et al. | |

OTHER PUBLICATIONS

Thomas Dresel et al., "Three-dimensional sensing of rough surfaces by coherence radar", *Applied Optics*, vol. 31, No. 7, pp. 919-925 (Mar. 1, 1992).

Akiko Harasaki et al., "Improved vertical-scanning interferometry", *Applied Optics*, vol. 39, No. 13, pp. 2107-2115 (May 1, 2000).

* cited by examiner

*Primary Examiner*—Gregory J. Toatley, Jr.
*Assistant Examiner*—Patrick Connolly
(74) *Attorney, Agent, or Firm*—Fish & Richardson P.C.

(57) ABSTRACT

A method including: providing a coherence profile and a phase profile derived from interferometry data for a test surface; calculating a phase gap map, wherein the phase gap map is related to a difference between the coherence profile and the phase profile; fitting an expression including a term based on the coherence profile to the phase gap map; and determining a height profile for the test surface using information derived from the fit.

48 Claims, 10 Drawing Sheets

| Step | Procedure |
|---|---|
| 110 | Acquire intensity vs. position data during an optical-path length scan of the interferometer |
| 120 | Transform into the frequency domain and use a least-squares fit to phase vs. wavenumber to generate experimental coherence and phase data. |
| 130 | Calculate a filled connected phase gap by removing $2\text{-}\pi$ jumps between pixels from a disconnected phase gap, calculated from phase data and filtered coherence data, filling in high-noise pixels by field averaging. |
| 140 | Calculate a fitted phase gap by fitting to the filled connected phase gap an offset, tipped, tilted and scaled version of the coherence profile, then weighting the fitted and filled connected phase gaps. |
| 150 | Calculate a field-corrected phase free of pixel-to-pixel fringe order errors, by combining phase and coherence information |
| 160 | Calculate an absolute phase incorporating all known phase and dispersion offsets. |
| 170 | Calculate a final high-resolution height profile from the absolute phase. |

Figure 1     100

| Step | Symbol | Procedure name | Ref. |
|---|---|---|---|
| 210 | a $I_{ex}(\zeta,x)$ | Experimental intensity vs. scan position data | Figure 4 |
| 220 | a $\phi_{ex}(k,x)$ | Experimental phase vs. wavenumber data | Eq. (3) |
| | b $a_{ex}(k,x)$ | Phase slope (by linear fit) | Eq. (4) |
| | c $b''_{ex}(k,x)$ | Phase intercept (by linear fit) | Eq. (5) |
| | d $\Theta_{ex}(x)$ | Phase-equivalent coherence profile | Eq. (6) |
| | e $\theta''_{ex}(x)$ | Wrapped experimental phase profile at $k_0$ | Eq. (7) |
| 230 | a $\Theta_{sm}(x)$ | Smoothed coherence profile | Eq. (18) |
| | b $\Gamma''(x)$ | Disconnected phase gap | Eq. (19) |
| | c $\Gamma'(x)$ | Connected phase gap | Eq. (20) |
| | d $\langle\Gamma'\rangle$ | Global average phase gap | Eq. (22) |
| | e $\Gamma'_{fill}(x)$ | Filled connected phase gap | p. 22 |
| 240 | a $\Gamma'_{fit}(x)$ | Surface fit expression including coherence profile to the filled connected phase gap | Eq. (24) |
| | b $\Gamma'_{final}(x)$ | Weighted average of fit and filled connected phase gaps | Eq. (28) |
| 250 | a $M'(x)$ | Field dependence of relative fringe order | Eq. (29) |
| | b $\theta'_{ex}(x)$ | Field-corrected phase profile | Eq. (30) |
| 260 | a $M_0$ | Absolute fringe order | Eq. (32) |
| | b $\theta_{ex}(x)$ | Absolute phase profile | Eq. (33) |
| 270 | a $h_{ex}(x)$ | Absolute height profile | Eq. (34) |

| Appearance | 2D Profile | Interpretation |
|---|---|---|
| Constant over the field of view | 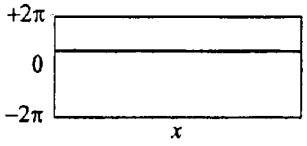 | This is the ideal case: Constant regardless of surface form or features |
| Overall tip or tilt | 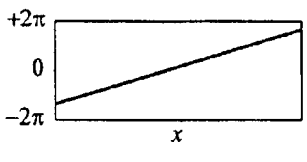 | Unbalanced wedge dispersion in cube beamsplitter (Michelson and Linnik objectives). |
| Steps that appear to correlate to changes in materials or films | 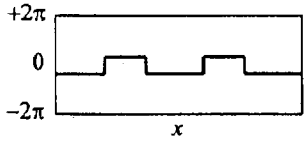 | Differences in phase change on reflection between surface regions |
| Shape that correlates to surface form | 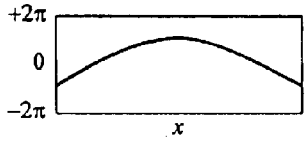 | Surface-slope dependent distortions related to optical aberrations. |
| Spikes | 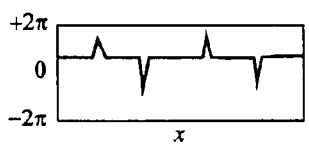 | Residual effects of diffraction at sharp edges of surface features, e.g. steps |
| Noise | 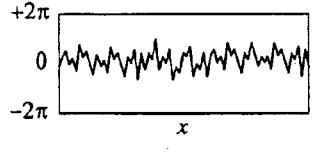 | Surface roughness, optical speckle or very low signal level |

Figure 6

PHASE GAP ANALYSIS FOR SCANNING INTERFEROMETRY

CROSS-REFERENCE TO RELATED APPLICATIONS

Under 35 U.S.C. 119(e), this application claims priority to U.S. Provisional Application Ser. No. 60/377,301 filed May 2, 2002 and entitled "PHASE GAP ANALYSIS FOR SCANNING WHITE LIGHT INTERFEROMETRY," the contents of which are incorporated herein by reference.

BACKGROUND

Height-scanning interferometry (HSI) employs broadband light sources to determine 3-D surface height profiles. HSI generates high-resolution profiles by combining two different pieces of information extracted from broadband interference patterns: coherence data and phase data. A low-resolution coherence height profile is derived from the localization of the interference effect, and a phase profile is calculated, e.g., from the interference phase itself, usually near the position of maximum interference signal strength (peak fringe contrast). By combining these two pieces of information, one can measure a high-resolution phase height profile of the surface without the fringe-order ambiguity normally associated with laser-based interferometry.

Fundamental to the success of high-resolution HSI is agreement between the data derived from coherence and phase information. Unfortunately, this is not always easily achieved. Optical distortions that vary with field position and object slope can deform the measured coherence and phase profiles in different ways, resulting in a mismatch that spoils prior-art techniques for determining fringe order in the phase profile. For example, a spherical object can contain erroneous changes in fringe order near the edges attributable in part to chromatic aberrations in the optics that distort the coherence profile. These and similar difficulties related to the mismatch between coherence and phase data can limit the range of application of high-resolution HSI.

SUMMARY

The invention features a low-coherence interferometer apparatus and interferometer method for profiling surfaces with reduced sensitivity to the mismatch between coherence and phase data. The apparatus and method use an algorithm that is based on the observation that phase gap errors generally mimic the surface profile itself. This observation leads to a fitting routine within a phase gap analysis technique that significantly enhances robustness and performance, in terms of data density and fidelity.

We now summarize various aspects and features of the invention.

In general, in one aspect, the invention features a method including: providing a coherence profile and a phase profile derived from interferometry data for a test surface; calculating a phase gap map, wherein the phase gap map is related to a difference between the coherence profile and the phase profile; fitting an expression including a term based on the coherence profile to the phase gap map; and determining a height profile for the test surface using information derived from the fit.

Embodiments of the method may include any of the following features.

The data may include an intensity signal $I(\zeta,x)$ produced by interfering a measurement wavefront reflected from the test surface with a reference wavefront reflected from a reference surface, where the wavefronts are derived from a common source, $\zeta$ is an optical-path difference scan position, and x is a field position corresponding to an object position on the test surface. The coherence profile may be calculated from a localization of interference fringes in the intensity signal with respect to the optical-path difference scan position $\zeta$. Alternatively, the coherence profile may be calculated from a wavevector dependence of a phase $\phi$ of a transform (e.g., a Fourier transform) of $I(\zeta,x)$ with respect to the optical-path difference scan position. The phase profile may be calculated from an interferometric phase of $I(\zeta,x)$ at a nominal wavevector $k_0$. For example, the phase profile may be calculated from a phase of a transform (e.g., a Fourier transform) of $I(\zeta,x)$ with respect to the optical-path difference scan position $\zeta$ at a nominal wavevector $k_0$.

Calculating the phase gap map may include expressing the coherence profile and the phase profile in common units. For example, the coherence profile may be expressed in radians with respect to a nominal wavevector $k_0$ according to $\Theta(x)=k_0 h_C(x)$, where $h_C(x)$ is a surface height profile of the test surface derived from the coherence profile, and wherein the phase profile is calculated as the interferometric phase $\theta(x)$ in radians of the interferometry data at the nominal wavevector $k_0$.

Calculating the phase gap map may include generating an experimental phase gap map related to the difference between the coherence profile and the phase profile and connecting $2\pi$ phase jumps in the experimental phase gap map. For example, generating the experimental phase gap map may include determining the difference between the coherence profile and the phase profile, and then setting the experimental phase gap map equal to the difference between the coherence profile and the phase profile. In another example, generating the experimental phase gap map may include filtering the coherence profile, and determining a difference between the phase profile and the filtered coherence profile. Filtering the coherence profile may include smoothing the coherence profile to round the edges in the coherence profile. Generating the experimental phase gap map may then further includes setting the experimental phase gap map equal to the difference between the phase profile and the filtered coherence profile.

Connecting $2\pi$ phase jumps in the experimental phase gap map may include adding $2\pi$ or integer multiples thereof to at least some locations in the experimental phase gap map to reduce phase jumps. For example, the connecting may further include calculating a metric corresponding to a local variation in the experimental phase gap map at each of multiple locations, and adding $2\pi$ or integer multiples thereof to at least some locations in the experimental phase gap map based on the value of the metric. Furthermore, for each location the metric may be proportional to a sum of the absolute values of differences between the experimental phase gap map at that location and at each adjacent location, wherein $2\pi$ or integer multiples thereof are added to each of the adjacent locations to minimize the sum. Also, the connecting may further include replacing the value of the experimental phase gap map at each location where the metric indicates that the local variation exceeds a threshold variation with a constant value. The constant value may be a global average of the experimental phase gap map that is determined by calculating at least one trigonometric function for multiple locations of the experimental phase gap map, averaging the results of each trigonometric function, and calculating an inverse trigonometric function based on each trigonometric average.

A difference between the experimental phase gap map and a theoretical phase gap map $G(x) = \gamma(x) - k_0 \tau(x)$ may be indicative of agreement between the coherence profile of the test surface and the phase profile of the test surface, wherein $\gamma(x)$ is a value of a phase offset at the nominal wavevector $k_0$ produced by reflections from the test surface and elements of the interferometer used to measure the interferometry data, and $\tau(x)$ is a value of linear dispersion in the phase offset with respect to wavevector. Also, the method of claim 19, may further include determining values for $\gamma(x)$ and $\tau(x)$.

The expression including the term based on the coherence profile may include a superposition of the term based on the coherence profile and a plane. For example, the term based on the coherence profile may be the coherence profile. Alternatively, the term based on the coherence profile may be selected to have surface form that matches the coherence profile. The plane may account for a tip and a tilt in the orientation of the test surface. In one example, the expression is given by $\Gamma_{fit}(x,y) = c_0 + c_1 x + c_2 y + c_3 \Theta(x,y)$, where $\Theta(x,y)$ is an expression for the coherence profile, x and y denote profile coordinates, and the fit determines the coefficients $c_0$, $c_1$, $c_2$, and $c_3$. The fitting may include using a least squares fit.

Determining the height profile may include determining a relative fringe order profile based on the information derived from the fit and the coherence and phase profiles. Determining the relative fringe order profile may include determining an integer multiple of $2\pi$ nearest to a difference between the expression and an experimental phase gap map related to the difference between the coherence profile and the phase profile for each of corresponding locations in the profiles.

In another example, determining the relative fringe order profile may include generating an experimental phase gap map related to the difference between the coherence profile and the phase profile, calculating a metric corresponding to a local variation in the experimental phase gap map at each of multiple locations, and determining an integer multiple of $2\pi$ nearest to a difference between a revised phase gap map and the experimental phase gap map for each of the multiple locations, wherein the revised phase gap map is based on the fitted expression and a connected version of the experimental phase gap map. For example, the connected version of the experimental phase gap map includes locations where $2\pi$ or integer multiples thereof are added to the experimental phase gap map to reduce phase jumps. Also, for each location the metric may be proportional to a sum of the absolute values of differences between the experimental phase gap map at that location and at each adjacent location, wherein $2\pi$ or integer multiples thereof are added to each of the adjacent locations to minimize the sum.

The revised phase gap map may corresponds to the connected version of the experimental phase gap map except for locations where the metric indicates that the local variation exceeds a threshold value in which case the revised phase gap map at those locations corresponds to the fitted expression. Alternatively, the revised phase gap map may be expressed as $\Gamma_{final}(x,y) = \Gamma_{fit}(x,y) + [\Gamma_{full}(x,y) - \Gamma_{fit}(x,y)]W(x,y)$, where $\Gamma_{fit}(x,y)$ is the fitted expression, $\Gamma_{full}$ is the connected version of the experimental phase gap, $W(x,y)$ varies from $W_{min}$ to 1 according to the degree of local variation indicated by the metric, where the value of $W(x,y)$ increases as the degree of local variation decreases, and x and y denote location coordinates.

Determining the height profile may further include determining the height profile of the test surface based on the phase profile and the relative fringe order.

Determining the height profile may also include determining an absolute fringe order profile based on the information derived from the fit, the coherence and phase profiles, and a theoretical phase gap map $G(x) = \gamma(x) - k_0 \tau(x)$, where the phase profile is calculated with respect to a nominal wavevector $k_0$, $\gamma(x)$ is a value of a phase offset at the nominal wavevector $k_0$ produced by reflections from the test surface and elements of the interferometer used to measure the interferometry data, and $\tau(x)$ is a value of linear dispersion in the phase offset with respect to wavevector.

In another aspect, the invention features a computer readable medium including a program that causes a processor to perform the steps of the method described above.

In general, in another aspect, the invention features an interferometry system including: a height-scanning interferometer which during operation measures height-scanning interferometry data for a test surface; and an electronic processor coupled to the height-scanning interferometer. During operation the electronic processor: determines a coherence profile and a phase profile from the height-scanning interferometry data; calculates a phase gap map, wherein the phase gap map is related to a difference between the coherence profile and the phase profile; fits an expression including a term based on the coherence profile to the phase gap map; and determines a height profile for the test surface using information derived from the fit.

Embodiments of the apparatus may also include any feature corresponding to those described above in connection with the method.

Unless otherwise defined, all technical and scientific terms used herein have the same meaning as commonly understood by one of ordinary skill in the art to which this invention belongs. In case of conflict with publications, patent applications, patents, and other references mentioned incorporated herein by reference, the present specification, including definitions, will control.

Other features, objects, and advantages of the invention will be apparent from the following detailed description.

BRIEF DESCRIPTION OF THE DRAWINGS

FIG. 1 is a flow chart of an interferometric data processing method.

FIG. 2 is a flow chart of an embodiment of the interferometric data processing method.

FIG. 6 is a chart of possible appearance and interpretation of the theoretical phase gap with noise terms $G(x) + \epsilon_\Theta(x) - \epsilon_\Theta(x)$.

DETAILED DESCRIPTION

Figure 3:
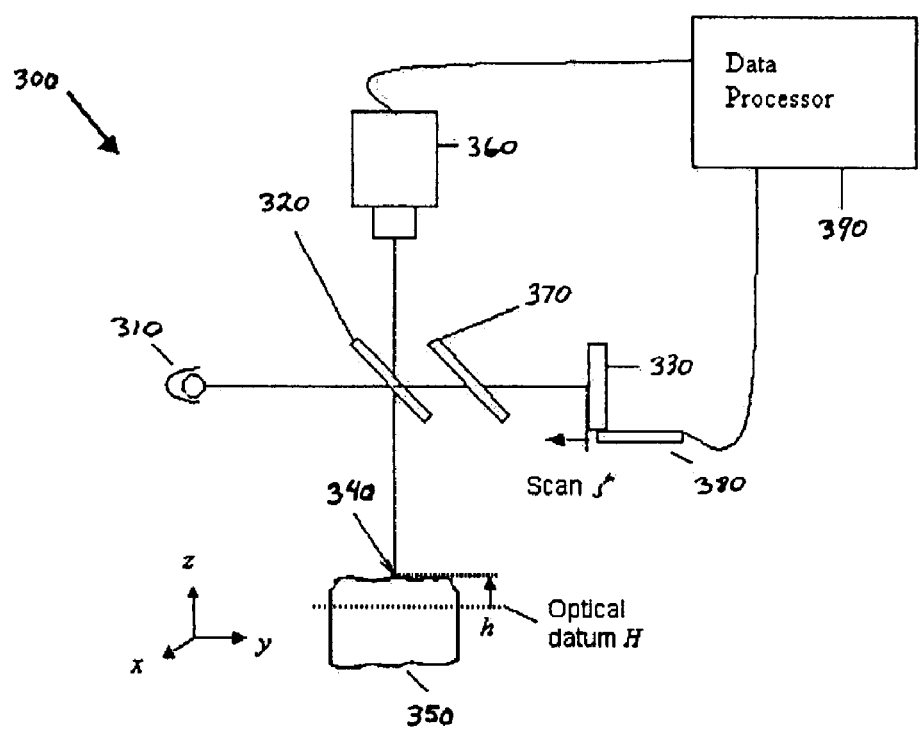
FIG. 3 is a schematic diagram of a two-beam height-scanning interferometer.

FIG. 1 is a flow chart of a data processing method 100 for calculating a surface profile from height scanning interferometry data. The basic steps of the method are summarized below and are followed by a more detailed description.

In step 110, a height scanning interferometer scans the surface of a part to collect height scanning interferometry data. In step 120, the method calculates a phase profile and a coherence height profile based on the interferometry data. Typically, the coherence profile has larger errors than those of the phase profile. On the other hand, the phase profile is not a unique surface profile because it suffers from fringe order ambiguity.

By combining the information in the coherence height profile and the phase profile, it is possible to overcome some of the drawbacks of either profiling method. Specifically, the coherence profile solves the fringe order ambiguity in the phase profile. This leads to a high-resolution phase height profile. Unfortunately, noise and imperfections can distort the coherence height profile. As a result, the correct fringe order in the phase profile may not be accurately determined and the high-resolution phase height profile contains errors. Moreover, it can be difficult to directly determine such errors from either the phase or coherence profiles.

Data processing method 100 addresses such problems by analyzing a phase gap related to the difference between the coherence profile and the phase profile. The correct fringe order can be more accurately determined from the difference between a disconnected and a connected version of the phase gap. The phase gap as initially calculated is disconnected, containing 2-π discontinuities, representing the fringe order information needed to resolve the fringe order ambiguity in the phase profile. The disconnected phase gap may also contain noise or distortions that can cause errors in calculating the connected version. Steps 130 and 140 contain certain aspects that help reduce some of these potential errors.

For example, one type of distortion that shows up in the phase gap occurs in the coherence profile from inaccurate profiling of sharp edges due to diffraction. The impact of this distortion can be reduced by filtering the coherence profile to smooth the edges before calculating the phase gap. Step 130 first calculates a disconnected phase gap using a smoothed coherence profile. Some noise and distortions may remain in this disconnected phase gap.

Step 130 then applies a phase connecting technique to connect the 2-π phase steps in the disconnected phase gap. Any one of several standard phase-connecting techniques can be used. A preferred technique preferentially connects lower noise regions of the phase gap first. Step 130 then connects higher noise regions with respect to the lower noise regions. Step 230 then fills in regions whose noise is above a predetermined threshold with a global average value, resulting in a filled connected phase gap. The fringe order can be estimated from the difference between these wrapped and the filled unwrapped phase gaps. For cases where the noise in the phase gap is low any low-order distortions in the phase gap will be present in both the wrapped and unwrapped versions and will cancel in the subtraction, not interfering with the fringe order determination.

For cases where there is significant noise there may remain a substantial number of disconnected regions that have been filled with the global average. Such discontinuities can cause errors in the fringe order determination. It can be beneficial to smooth these discontinuities by replacing the filled connected phase gap with a smooth surface that is fit to it. However, if this fitted surface does not accurately represent low-order distortions that are present in the disconnected phase gap then they will not cancel in the subtraction and may cause errors in the fringe order determination.

Taking advantage of the observation that low-order distortions in the phase gap are often correlated to features in the coherence profile, a more accurate fit can be calculated which preserves the low-order distortions in the phase gap. Step 140 therefore fits an expression that includes the coherence profile (or a term based on the coherence profile) to the filled connected phase gap. This provides a significant advantage for more accurately estimating the fringe order ambiguity. Some embodiments may also include tip and tilt terms in the expression to take into account tip or tilt in the coherence profile.

Next, step 140 calculates a final phase gap, which is a weighted sum of the fitted surface and the filled connected phase gap. The weighting coefficient is based on the noise in the phase gap. So regions of high noise will be weighted to follow the fitted surface, and regions of low noise will be weighted to follow the filled connected phase gap. Using this final phase gap, step 150 calculates a field corrected phase. This phase profile is accurate up to an overall phase. By accounting for phase and dispersion offsets, step 160 accounts for this overall phase offset. Finally step 170 calculates a high-resolution phase height profile of the surface.

FIG. 2 show a more detailed flow chart of a particular embodiment (method 200) of the method of FIG. 1, and makes reference to specific equations described further below.

In step 210, a height scanning interferometer is used to collect interferometric data. One example of a height scanning interferometer is the two-beam interferometer shown in FIG. 3. Referring to FIG. 3, an interferometer 300 includes a broadband light source 310, interferometer optics such as a beam splitter 320 for defining a reference path to a reference mirror 330 and a measurement path to a surface 340 of an object part 350, and a camera 360 for recording interferometric images resulting from recombining the wavefronts from the reference and measurement legs. The surface 350 has features of height h(x) in the z direction referenced to a fixed optical datum H. Interferometer 300 also includes a mechanism 380 for modifying or scanning the optical paths in a controlled way such as a piezoelectric transducer coupled to reference mirror 330, and a data processor 390 coupled to camera 360 and the scanning mechanism for analyzing the interferometric data recorded by the camera. A dispersion compensation element 370 is positioned in the reference path to compensate for the path lengths for dispersion caused by the beam splitter.

The data processor 390 records intensity data I (ζ,x) in successive camera frames during a continuous scan, where we have abbreviated the x,y lateral field position of the pixel simply as x. The intensity as a function of scan position is given by $$I(\zeta,x)=1+V[h(x)+\tau(x)/2n-\zeta] \cos [2nk_0(h(x)-\zeta)+\gamma(x)] \qquad (1)$$

where V is the fringe contrast envelope. The envelope V is proportional to the Fourier transform of the spectral distribution of the light as detected by the camera, including the spectral sensitivity of the camera itself. ζ is the reference mirror scan position which corresponds to the optical-path difference, where a ζ=0 scan position corresponds to a zero optical path difference at datum H. γ(x) is the phase change on reflection (PCOR) evaluated at the nominal wavenumber $k_0$. It is well known that upon reflection from a surface, a light beam is given an additional phase offset dependent on the optical properties of the reflecting surface. This is the physical basis for PCOR. The value of γ(x) includes PCOR contributions from not only the sample but also the interferometer optics, and any constant offsets resulting, e.g., from the starting position of the scan ζ. The coefficient τ(x) corresponds to the linear dispersion of PCOR evaluated at the nominal wavenumber $k_0$. Dispersion in PCOR results from the frequency dependence of PCOR. A first order (linear) correction for this frequency dependence is given by τ(x).

The distance traveled by the reference mirror between two successive camera frames is the fundamental unit of measure. This distance is defined as a frame and will be used throughout. This is quite different from conventional phase shifting interferometry, for which the light source wavelength is the basic metric. For this reason, all height- or scan-related variables are expressed in frame units or the equivalent. The height profile h(x) itself will be calculated in frame units.

Figure 4:
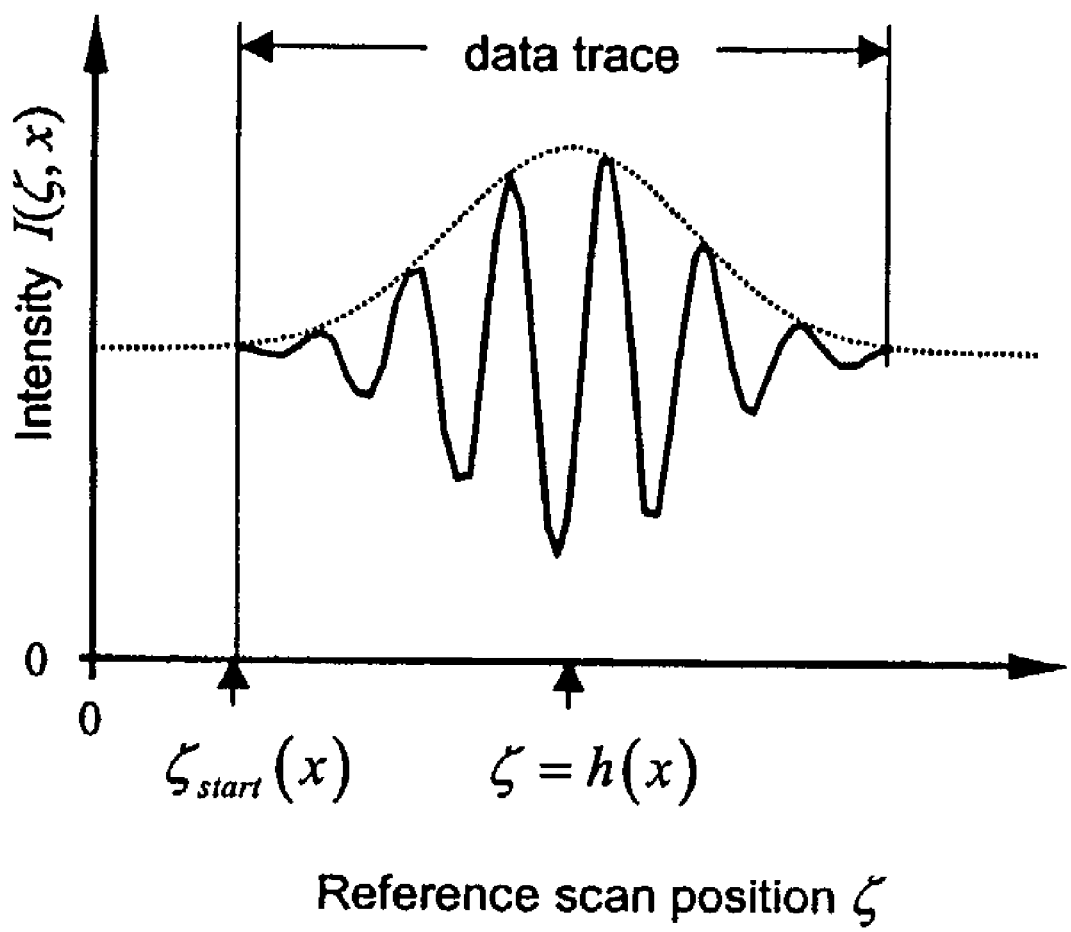
FIG. 4 is a single-pixel interference pattern showing a high-contrast area beginning at scan position $\zeta_{start}(x)$. The scan position $\zeta = 0$ corresponds to the optical datum H shown in FIG. 3.

FIG. 4 shows an example of such intensity vs. scan position data. The broadband interference pattern shown in FIG. 4 is highly localized near the zero optical path difference position, for which the scan position ζ is close to h(x). To conserve memory and accelerate computations, step 210 sub-samples the interference pattern and records only a 64-frame data trace centered on this high-contrast position. The scan position $\zeta_{start}(x)$ corresponding to the first camera frame of the data trace is typically different for every pixel in the field of view.

Using the interferometric data, step 220 calculates both the coherence and phase profile. The method does not analyze the fringe contrast of the intensity pattern shown in FIG. 4. Instead, the method focuses on the behavior of the interference phase as a function of wavenumber in the Fourier decomposition of I (ζ,x). Following data acquisition, the step 220 performs a Fourier transform (FT), resulting in spectrum data P (k,x) and phase data φ(k,x):

$$P(k,x)=|FT[I(\zeta,x)]|^2 \quad (2)$$

$$\phi(k,x)=\arg\{FT[I(\zeta,x)]\} \quad (3)$$

where k is the wavenumber. A typical value for k is π/2 radians/frame, the equivalent of 4 camera frames per cycle of interference or 16 cycles per 64-frame trace.

The useful phase data φ(k,x) generated by the Fourier transform in Eq. (3) are restricted to a wavenumber range consistent with the spectral distribution P(k,x) of the source. The peak in the spectrum defines a nominal wavenumber $k_0$ and a useful spectral range beginning at $k_0-k_\Delta$. A linear least-squares fit to the phase data within this range, weighted by the spectral distribution P(k,x), provides for each pixel a slope $$a(x)=d\phi/dk|_x \quad (4)$$

and an intercept $$b(x)=\phi(k_0-k_\Delta,x) \quad (5)$$

The phase slope offset by the starting scan position $\zeta_{start}(x)$ can be used to define a coherence profile, expressed here in phase units at the nominal wavenumber $k_0$:

$$\Theta(x)=k_0 a(x)+k_0 \zeta_{start}(x) \quad (6)$$

The coherence profile is closely related to the localization of the interference fringes. The phase at $k_0$ offset by the starting scan position $\zeta_{start}(x)$ can be used to define the phase profile:

$$\theta(x)=k_\Delta a(x)+b(x)+k_0\zeta_{start}(x). \quad (7)$$

In Eq. (7), potential fringe-order ambiguity is suppressed for the sake of clarity in the theoretical presentation.

Figure 5:
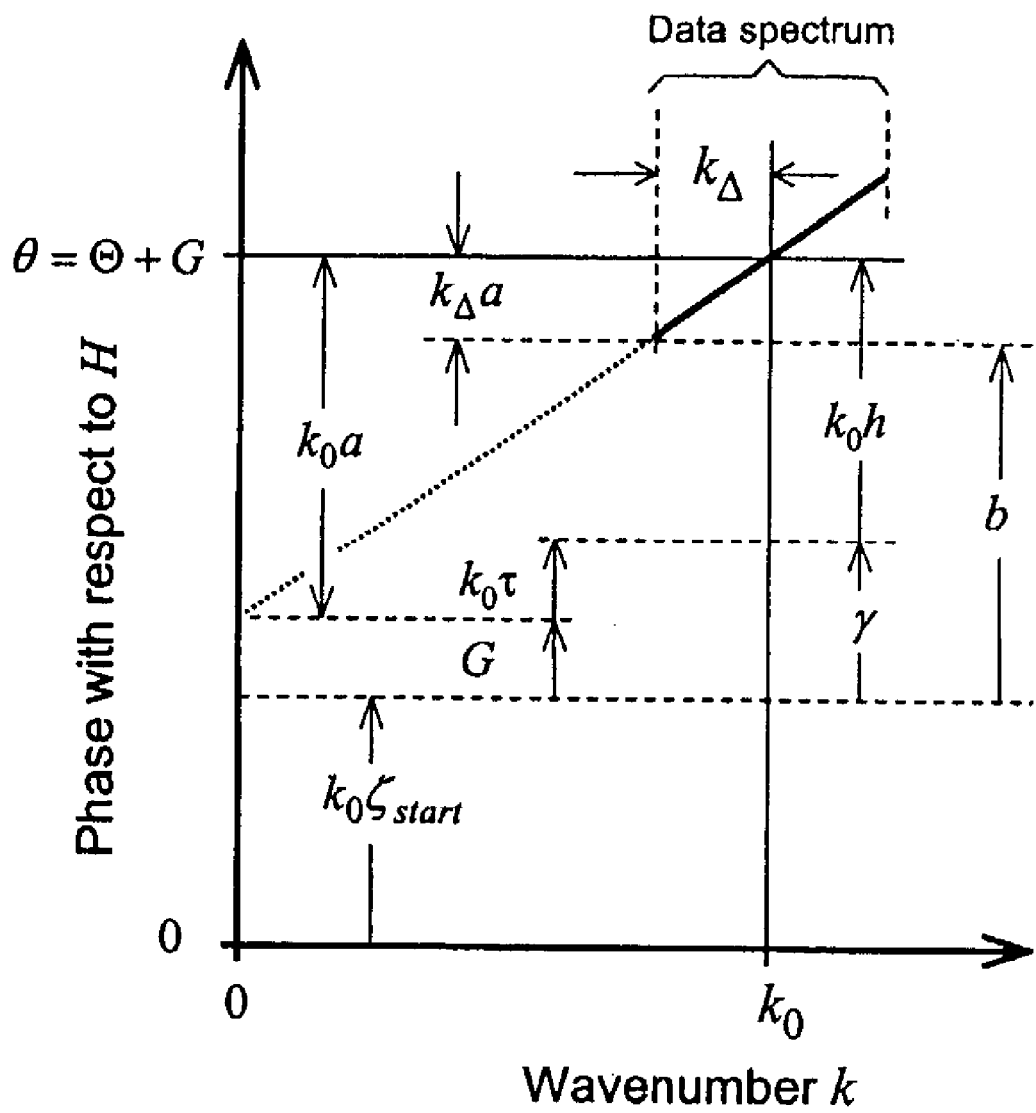
FIG. 5 is a phase and frequency domain graph of the Fourier transform of typical HSI data. The quantity G is the phase gap, which is a measure of agreement between the coherence and phase data.

The coherence and phase profiles are both indicative of surface height profile. FIG. 5 further details the relevant features of the frequency domain phase data. In a linear expansion, the interference phase φ(k,x) about a nominal wavenumber $k_0$ near the center of the FT spectrum is $$\phi(k,x)=k[h(x)-\zeta_{start}(x)]+\gamma(x)+(k-k_0)\tau(x). \quad (8)$$

From Eq. (8) we can extract two formulas for surface height with respect to the optical datum H using the phase and coherence profiles. Using the definitions of θ(x),Θ(x) from the previous page, inversion of Eq. (8) at $k=k_0$ yields $$h(x) = \frac{1}{k_0}[\theta(x) - \gamma(x)]. \quad (9)$$

Inversion of the derivative of Eq. (8) with respect to k gives $$h(x) = \frac{1}{k_0}[\Theta(x) - k_0\tau(x)]. \quad (10)$$

Eq. (9) is the basis for a high-resolution measurement of surface height; however, in that phase detection is periodic in 2π radians, there is a potentially unknown fringe order offset to an experimental measurement of θ(x). The coherence-based calculation of Eq. (10) is inherently lower resolution than Eq. (9), but is free of fringe-order ambiguity.

As mentioned above, the coherence and phase information are combined to provide high-resolution phase height absolutely. Of particular interest therefore is the difference or phase gap G(x) between the phase and coherence profiles, which may be defined as:

$$G(x)=\theta(x)-\Theta(x). \quad (11)$$

In theory, the phase gap is the k=0 intercept of the phase data and is given by $$G(x)=\gamma(x)-k_0\tau(x). \quad (12)$$

It is clear from Eq. (11) that the phase gap G(x) is a measure of the agreement between the phase profile and the coherence profile (see FIG. 4). The phase gap plays an important role in the detailed error processing that follows.

In practice, experimental uncertainties complicate the theoretical equations of the previous section and make accurate fringe order estimation error prone. The following steps (steps 230–260) address these errors. To clarify this discussion, error terms are explicitly included. The experimentally measured coherence profiles $\Theta_{ex}(x)$ based on phase slopes have significant errors $\epsilon_\Theta(x)$ in the form of random noise and low-spatial frequency distortions, frequently exceeding 2π radian:

$$\Theta_{ex}(x)=\Theta(x)+\epsilon_\Theta(x), \quad (13)$$

where the subscript ex emphasizes that this is an experimental value. A noise term $\epsilon_\theta(x)$ also corrupts the experimental phase profile, which additionally suffers from an inherent fringe-order ambiguity:

$$\theta''_{ex}(x)=\theta(x)+\epsilon_\theta(x)+2\pi[M(x)+M_0] \quad (14)$$

where the integer $M(x)$ is a field-dependent fringe order error and $M_0$ is an overall fringe-order offset error with respect to the theoretical phase profile $\theta(x)$. The double primes emphasize this two-fold ambiguity. The factor of $2\pi$ assumes that the phase units are in radians.

For surfaces that appear smooth and uniform at the wavelength of the source light, the phase noise term $\epsilon_\theta(x)$ is generally very much less than the coherence noise term $\epsilon_\Theta(x)$ and in this limit, therefore, the fundamental task is to determine the fringe order error $M(x)+M_0$ appearing in Eq. (14), so that we can use the low-noise phase profile to measure surface form with high precision.

Because of the possibility of discontinuous surface features, we cannot directly determine fringe order by inspection of the experimental phase profile $\theta''_{ex}(x)$ alone. Instead, step 230 calculates an experimental phase gap between the coherence and phase profiles according to:

$$G''_{ex}(x)=\theta''_{ex}(x)-\Theta_{ex}(x). \quad (15)$$

The structure of the phase gap is known without the need for assumptions about the surface profile being measured. As such, it is a stable objective tool used to identify and control errors. The theoretical phase gap $G(x)$ is expected to be nearly constant over the entire surface, regardless of surface orientation and even in the presence of sharp surface feature many times higher than one wavelength. Combining Eqs. (13), (14) and, (15)

$$G''_{ex}(x)=G(x)+\epsilon_\theta(x)-\epsilon_\Theta(x)+2\pi[M(x)+M_0]. \quad (16)$$

In the limit of noise-free data (e.g. $\epsilon_\theta=\epsilon_\Theta=0$), Eq. (16) is simply the fringe order error plus the theoretical phase gap $G(x)$. In this limit, the fringe order errors are easy to detect and quantify with a known value for $G(x)$ from Eq. (12). However, in practice, the exact values of the offsets $\gamma(x)$, $\tau(x)$ are often uncertain and our a priori knowledge of the theoretical phase gap $G(x)$ is incomplete. We therefore use an empirical technique for estimating or approximating the theoretical phase gap. We estimate $G(x)$ using a connected version $\Gamma'(x)$ of the experimental phase gap $G''_{ex}(x)$. Note the single prime in $\Gamma'(x)$, indicating that this procedure removes $2\pi$ pixel-to-pixel phase steps but leaves an overall fringe order uncertainty with respect to H which is accounted for in step 260.

One way to estimate $G(x)$ is to assume it to be a constant average value over the field of view. However, in practice, we have found that there are frequently distortions in the phase gap attributable to the x field dependence of the phase and dispersion offsets $\gamma(x)$, $\tau(x)$. Including the noise terms, some of the more frequently observed phase gaps are catalogued in FIG. 6. So even in the absence of noise, the simple averaging technique to approximate $G(x)$ is an oversimplification that can lead to misidentification of fringe order.

A preferred approach to estimating $G(x)$ is connecting the experimental phase gap applying one of the many known techniques for adding or subtracting $2-\pi$ to data in adjacent pixels. This approach preserves the general form of the phase gap so that one can separate the fringe order from distortions traceable to the coherence profile. The $2-\pi$ steps between neighboring pixels of $G''_{ex}(x)$ can be connected by using standard phase conecting or "unwrapping" techniques. See, e.g., D. C. Ghiglia and M. D. Pritt, "Two-dimensional phase unwrapping: Theory, algorithms, and software" (John Wiley & Sons, Inc. New York, 1998). Unfortunately, the connect procedure may be complicated by the noise in the error terms $\epsilon_\Theta(x)$, $\epsilon_\theta(x)$, which make direct connection of the phase gap data $G''_{ex}(x)$ prone to mistakes.

One type of error that step 230 is designed to cope with is error due to diffraction. Coherence information, i.e., phase derivative data, is sensitive to diffraction. Diffraction effects generate large, localized swings in the coherence error term $\epsilon_\Theta(x)$. An approach to detecting and suppressing these distortions is to subtract edge effects from the coherence profile as follows. First, the edges in the coherence profile are located using $$\delta\Theta(x)=\Theta_{ex}(x)-\text{smooth}[\Theta_{ex}(x)]. \quad (17)$$

The filter function smooth may for example be a simple pixel averaging algorithm, a convolution algorithm, or any other type that properly accounts for invalid data points. We generally use a double pass of a 3×3 pixel average for testing purposes. Next, placing some limits, e.g. $\pm\pi/2$ on $\delta\Theta(x)$ the method defines:

$$\Theta_{sm}(x)=\Theta_{ex}(x)-\delta\Theta(x), \quad (18)$$

where the subscript sm indicates that a field-averaging smoothing filter has been applied to the data. We then calculate the disconnected phase gap using this smoothed version of the coherence profile:

$$\Gamma''(x)=\theta''_{ex}(x))-\Theta_{sm}(x). \quad (19)$$

The smoothing has the effect of rounding the sharp edges of features where diffraction effects are most prominent.

Step 230 applies a connect procedure to remove $2-\pi$ steps between pixels, using any one of the standard techniques for connecting phase data:

$$\Gamma'(x,y)=\text{connect}[\Gamma''(x,y)], \quad (20)$$

where we have now expanded the lateral field position x to explicitly indicate both x and y dimensions. In a preferred technique, the connect function sorts the pixels into classes prior to connecting according to the noise level of the surrounding pixels. Step 230 connects pixels with lowest noise first, then progresses through all of the pixels according to increasing noise level. The noise level is determined according to a merit function Merit(x,y) which is a metric corresponding to the local variation in the disconnected phase gap. Though other versions of the merit function may be used, one example is given by calculating the mean deviation of the 8 neighboring pixels from the center value:

$$\text{Merit}(x,y) = \sum_{i=-1}^{1}\sum_{j=-1}^{1} |\Gamma''(x+i, y+j) - \Gamma''(x,y)|. \quad (21)$$

In this sum each neighboring pixel $\Gamma''(x+i, y+j)$ is first locally connected to the center pixel $\Gamma''(x,y)$ by adding an integer multiple of $2\pi$ to it such that the sum is minimized. This local connecting allows phase noise to be distinguished from a location of a phase discontinuity due to phase wrapping that is otherwise noise free. Pixels having a metric value below a threshold $\text{Merit}_{max}$ (e.g. 15% of a full $2\pi$ cycle) are connected within continuous zones of the field. Pixels having a metric value above the threshold $\text{Merit}_{max}$ are left unconnected. Zones below a certain size (e.g. 10 pixels) are also left unconnected. The entire field may also be shifted by an integer multiple of $2\pi$ such that its average value is between $-\pi$ and $\pi$.

Step 230 then fills in these pixels in the connected phase gap $\Gamma'(x,y)$ that have been left unconnected by setting their values to a constant global average value $<\Gamma>$ which yields the filled connected phase gap $\Gamma'_{fill}(x,y)$. Because phase data are periodic, an appropriate averaging technique is to average the sine and cosine data, rather than the connected phase gap itself, to avoid complications related to phase wrapping. Thus, step 230 uses:

$$<\Gamma'>=\arctan 2[<C>, <S>] \quad (22)$$

where $$S(x,y)=\sin[\Gamma''(x,y)]$$

$$C(x,y)=\cos[\Gamma''(x,y)] \quad (23)$$

and the $<>$ brackets indicate global averaging over all valid data points. $<\Gamma'>$ is used in place of $<\Gamma'(x,y)>$. The arctan2 [a,b] function calculates arctan (b/a), and returns an angle in the correct quadrant. It is not unusual to have a mixture of noise levels across an object surface, corresponding to differences in surface texture, complex surface features or variable light level. As a consequence, the filled connected phase gap $\Gamma'_{fill}(x,y)$ may have a significant number of disconnected regions that have been filled with the global average.

Step 240 performs a procedure to smooth these potentially disconnected regions corresponding to different noise levels. It is often the case that the overall shape of the connected phase gap can be approximated by a surface fit. Therefore, step 240 fits an expression representing a 3-D surface $\Gamma'_{fit}(x,y)$ to the filled connected phase gap $\Gamma'_{fill}(x,y)$. By taking advantage of the observation that surface-slope dependent optical distortions within the instrument often lead to phase gap characteristics that closely correlate to surface form, method 200 gains an advantage in robustness and performance, in terms of data density and fidelity. Since the coherence profile contains these surface form characteristics the expression used for the fit includes the coherence profile $\Theta(x,y)$:

$$\Gamma'_{fit}(x,y)=c_0+c_1x+c_2y+c_3\Theta(x,y) \quad (24)$$

As shown here, this expression may also include a plane, which can accommodate linear tip or tilt of the coherence profile, which are often traceable to uncompensated dispersion in Michelson objectives. Alternatively, linear tip or tilt of the coherence profile could be accounted for earlier when the coherence data is collected. The surface fit makes it possible to smooth noisy phase gap data while preserving surface features, which, if removed, could lead to errors in the fringe order determination.

This expression can be fit to the filled connected phase gap using a weighted least-squares technique for which the coefficients $c_0, c_1, c_2, c_3$ are free parameters. The resulting matrix equation is:

$$\begin{pmatrix} c_0 \\ c_1 \\ c_2 \\ c_3 \end{pmatrix} = \begin{pmatrix} \langle 1 \rangle & \langle x \rangle & \langle y \rangle & \langle \Theta \rangle \\ \langle x \rangle & \langle x^2 \rangle & \langle xy \rangle & \langle x\Theta \rangle \\ \langle y \rangle & \langle xy \rangle & \langle y^2 \rangle & \langle y\Theta \rangle \\ \langle \Theta \rangle & \langle x\Theta \rangle & \langle y\Theta \rangle & \langle \Theta^2 \rangle \end{pmatrix}^{-1} \begin{pmatrix} \langle \Gamma'_{fill} \rangle \\ \langle x\Gamma'_{fill} \rangle \\ \langle y\Gamma'_{fill} \rangle \\ \langle \Theta\Gamma'_{fill} \rangle \end{pmatrix} \quad (25)$$

where $\langle f \rangle = \sum_{x,y} W(x,y) f(x,y). \quad (26)$

The field-dependent confidence function $W(x,y)$ is based on the merit function:

$$W(x,y) = \frac{\text{Merit}_{max} - (1 - W_{min})\text{Merit}(x,y)}{\text{Merit}_{max}} \quad (27)$$

and normalized such that it is in the range $W_{min} \leq W(x,y) \leq 1$. Pixels having high noise such that they have a metric value $\text{Merit}(x,y)$ above the threshold $\text{Merit}_{max}$ get mapped to a value of $W(x,y)=W_{min}$. In the limit of no noise $\text{Merit}(xy)=0$ and $W(x,y)=1$. Thus, low-noise regions are favored in the fit. In other embodiments, the fit may involve a basis function other than the explicit coherence profile $\Theta(x,y)$, where such basis function is based on the coherence profile and has surface form characteristics matching the object whose height is being scanned. For example, a sphere approximation to the phase gap may be applied for balls and lenses, where suitable parameter(s) for the curvature of the sphere approximation are determined from the coherence profile.

Next, step 240 calculates the final phase gap $\Gamma'_{final}(x,y)$. The fit function $\Gamma'_{fit}(x,y)$ is balanced or blended with the filled connected phase gap $\Gamma'_{fill}(x,y)$ using the confidence function $W(x)$ as a moderator:

$$\Gamma'_{final}(x,y)=\Gamma'_{fit}(x,y)+[\Gamma'_{fill}(x,y)-\Gamma'_{fit}(x,y)]W(x). \quad (28)$$

In the high-noise limit $W=W_{min}$, usually encountered on very rough surfaces, the phase gap relies heavily on the surface fit value $\Gamma'_{fit}(x,y)$. In the low-noise limit, the phase gap tends towards the filled connected value $\Gamma'_{fill}(x,y)$.

With the final phase gap $\Gamma'_{final}(x,y)$ step 250 may estimate the the field-dependent fringe order term $M'(x)=M(x)+M_0$ up to a common fringe order $M_0$ with respect to datum H as:

$$M'(x) = \text{round}\left[\frac{\Gamma''(x) - \Gamma'_{final}(x)}{2\pi}\right] \quad (29)$$

where the function round returns the integer nearest its argument, and we have again abbreviated the x,y lateral field position of the pixel as x. Step 250 then calculates a field-corrected experimental phase profile $$\theta'_{ex}(x)=\theta''_{ex}(x)-2\pi M'(x). \quad (30)$$

The single prime indicates that the field-dependent errors have been removed, but there is still an overall fringe order error $M_0$ common to all pixels. Parenthetically, this calculation may change the numerical value of $M_0$ depending on the starting point of the connect process, but this has no practical consequence. A relative surface profile with respect to datum H may now be calculated as:

$$h'_{ex}(x) = \frac{1}{k_0}[\theta'_{ex}(x) - \gamma(x)] \quad (31)$$

Step 260 removes the overall fringe order error $M_0$, making it possible to measure surface heights absolutely with respect to an established datum. For the purposes of determining the fringe order $M_0$ in many cases it is sufficient to know the average values $\langle\gamma(x)\rangle$, $\langle\tau(x)\rangle$. If the distortions in the phase gap are not too severe, we can detect an overall fringe order $M_0$ that is common to all pixels by averaging the final phase gap and applying:

$$M_0 = \text{round}\left[\frac{\langle\Gamma'_{final}(x,y)\rangle - \langle\gamma(x)\rangle - k_0\langle\tau(x)\rangle}{2\pi}\right] \quad (32)$$

and calculate a final experimental phase profile free of all fringe-order errors:

$$\theta_{ex}(x) = \theta'_{ex}(x) - 2\pi M_0. \quad (33)$$

Note that $\theta_{ex}(x)$ is free of both relative fringe order error (i.e. M'(x) has been removed using Eq. (30)) and it is free of the overall fringe order error $M_0$. Therefore the phase profile expressed in Eq. (33) represents the absolute phase relating the surface profile to optical datum H. The final experimental height is calculated in step 270.

$$h_{ex}(x) = h'_{ex}(x) - \frac{2\pi M_0}{k_0} \quad (34)$$

Note that this height value is in units of camera frames, assuming that the phase values are in radians and $k_0$ is in units of radians per frame.

The absolute-height calculations (Step 160 in FIG. 1 and Step 260 in FIG. 2) involve phase and dispersion offsets $\gamma(x)$, $\tau(x)$. The methods described above do not require that we know what these offsets are in order to be useful. For example, if we care only about the surface profile and we have high confidence that the instrument has few system errors that would distort this profile, then we can simply set these offsets to zero. In other cases, however, an estimate for such offsets can be useful.

The phase and dispersion offsets have contributions from both the system (subscript sys) and the part itself (subscript part):

$$\gamma(x) = \gamma_{part} + \gamma_{sys}(x) \quad (39)$$

$$\tau(x) = \tau_{part} + \tau_{sys}(x). \quad (40)$$

The system phase offset $\gamma_{sys}(x)$ is very useful even for routine profiling, because it is a measure of the distortions in the measurement system. The system dispersion offset $\tau_{sys}(x)$ is useful for absolute height measurements with respect to a datum. The part offsets $\gamma_{part}$, $\tau_{part}$ are useful for relational measurements between surfaces or surface regions having dissimilar materials. Note that the part offsets $\gamma_{part}$, $\tau_{part}$ may be different from one surface region to another, however, variations within any one region are typically small. For simplicity, therefore, an explicit x,y field dependence is not shown. Finally, we note that the process of establishing the offsets $\gamma(x)$, $\tau(x)$ is related to a particular choice of the nominal wavenumber $k_0$.

Figure 7:
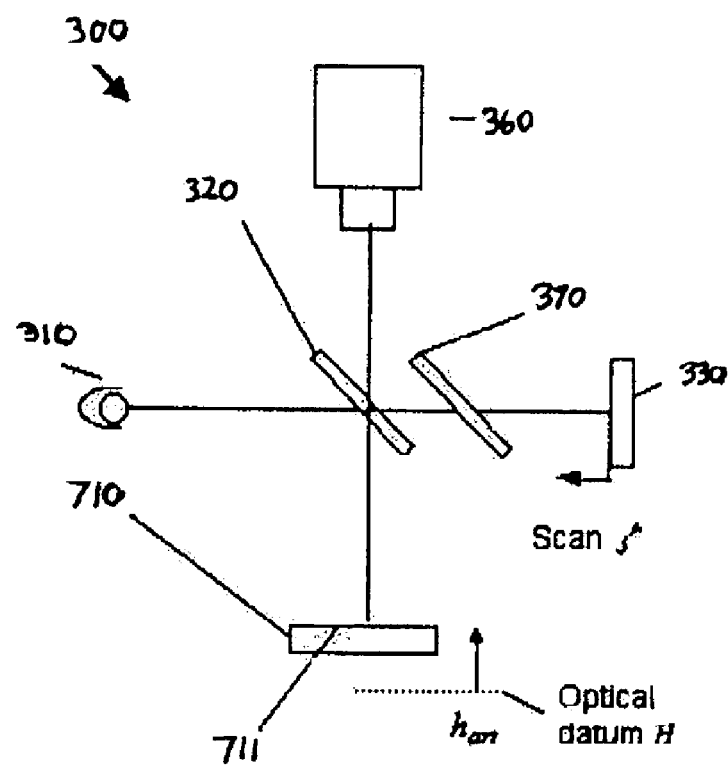
FIG. 7 is a schematic diagram of an interferometer used to characterize both PCOR and the dispersion in PCOR using a known dielectric artifact.

The values may be entered as known constants by the user or they may be measured. The procedure that establishes $\gamma_{sys}$, $\tau_{sys}$ is a system characterization. System characterization also establishes implicitly the location and shape of the optical profiler datum H. System characterization involves a characterization artifact having known optical properties $\gamma_{art}$, $\tau_{art}$ and surface form $h_{art}$. Referring to FIG. 7, the artifact 710 is inserted temporarily in the field of view of interferometer 300 and a measurement of the phase profile $\theta(x)$ of the artifact surface 711 provides the necessary information for determining the system phase offset $\gamma_{sys}(x)$. Referring to Eqs. (9) and (39), it follows that $$\gamma_{sys}(x) = \theta(x) - \gamma_{art}(x) - 2k_0 h_{art} \quad (41)$$

Note that the phase profile $\theta(x)$ should be unwrapped, meaning that $2\pi$ fringe jumps must be removed under the assumption that the artifact is a continuous surface.

Once the $\gamma_{sys}(x)$ is known, the value of $\tau_{sys}(x)$ can be determined as $$\tau_{sys}(x) = (\gamma_{art} + \gamma_{sys}(x) - G''_{ex}(x))/k_0 - \tau_{art} \quad (42)$$

where $G''_{ex}(x)$ is the experimentally-observed phase gap (Eq. (15)). Here again, all of the values with the exception of n and $k_0$ are expected to have an x,y field dependence related to optical distortions such as chromatic and spherical aberrations. There may also be a dependence on the tip and tilt of the part, which if it is substantial, will have to be recorded and used in the remaining calculations in much the same way as the x,y field dependence.

Part PCOR values $\gamma_{part}$ can be calculated from well-established physics principles governing reflection from an interface (e.g., the Fresnel equations) and tabulated values for the complex refractive index n+ik of the part material. The part PCOR dispersion value $\tau_{part}$ can be determined in a manner similar to the system characterization using the experimentally observed phase gap $G''_{ex}(x)$ and known values for $\gamma_{part}$ and $\tau_{sys}$:

$$k_0 \tau_{part} = \langle(\gamma(x) - G''_{ex}(x)) - k_0 \tau_{sys}(x)\rangle \quad (43)$$

For most pure materials, we expect the height offset $\tau_{part}/2n$ to be of the same order of magnitude as $\gamma_{part}/2nk_0$ and to have the same sign. An alternative method for determining $\tau_{part}$ is to calculate the dispersion of calculated PCOR values using tabulated values of n+ik as a function of wavelength.

Figure 8:
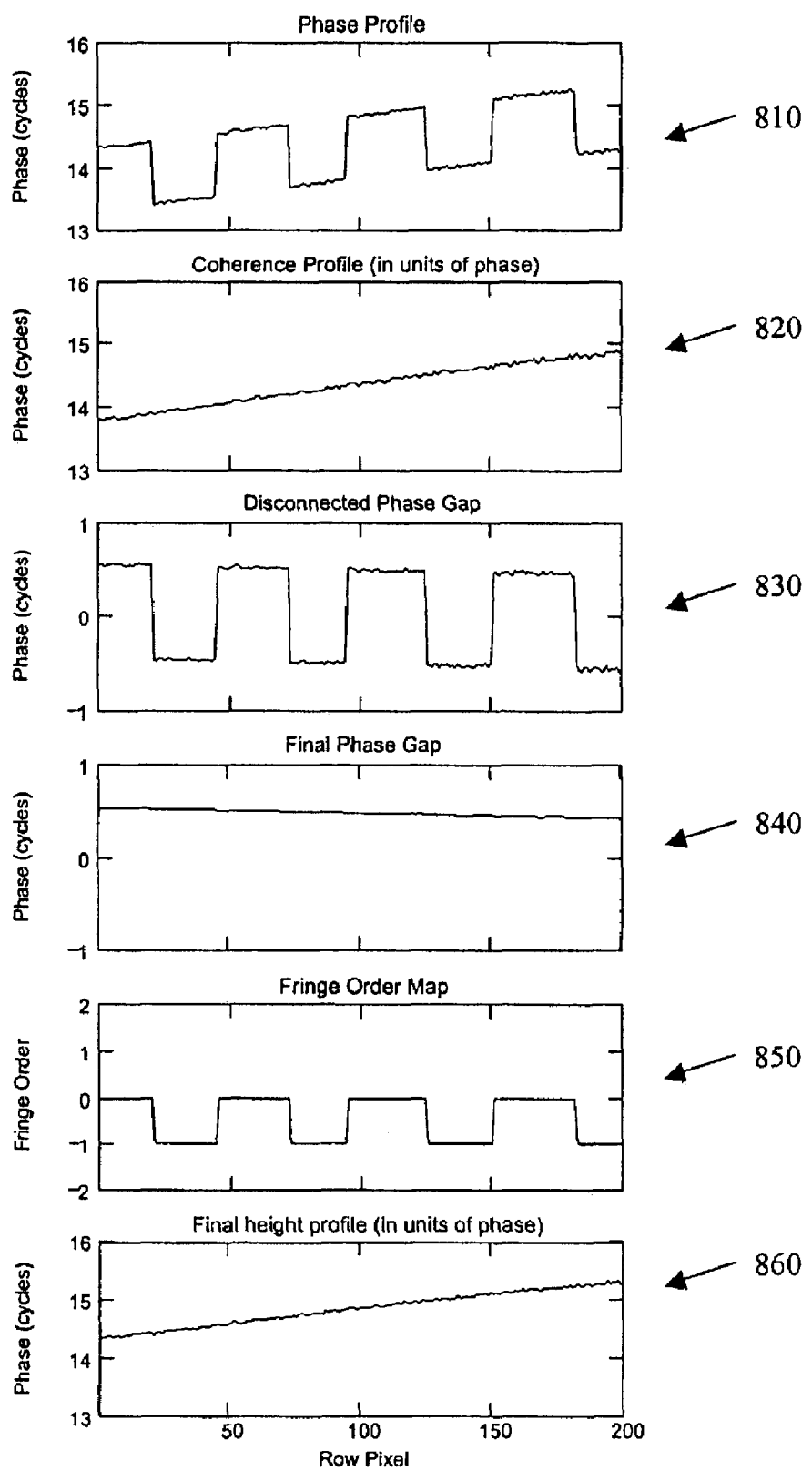
FIG. 8 is a set of plots illustrating the calculation of a height profile from phase and coherence profiles from interference data from a tilted silicon carbide flat surface.

As an illustrative example of method 200, we consider in FIG. 8 the real data sample for a flat surface having a small amount of tilt. A plot of the disconnected phase profile $\theta''(x)$ 810 shows step features of approximately one 2-π phase cycle in size. Setting aside for the moment our knowledge of the sample, it cannot be known from the disconnected phase profile $\theta''(x)$ alone whether these steps are simply fringe order errors or actual surface features.

To correctly identify fringe order, we show plots of the coherence profile $\Theta(x)$ 820 in units of phase at $k_0$ and then the disconnected phase gap $\Gamma''(x)$ 830. The plot of the final phase gap $\Gamma'_{final}(x)$ 840 is then generated using Eq. (28). In this case it is nearly a constant value, indicating that the phase and coherence data are in good agreement across the field; although there is a small inclination perhaps related to a dispersion imbalance in the beam splitting prism of the Michelson interferometer objective. From the difference of the disconnected phase gap $\Gamma''(x)$ and the final phase gap $\Gamma'_{final}(x)$ a plot of the relative fringe order M'(x) 850 is shown in FIG. 8. The final plot 860 is the surface height in units of phase at the nominal wavenumber $k_0=2\pi/280$ nm. Thus the height h'(x) in FIG. 8 is equal to 280 nm per cycle.

Figure 9:
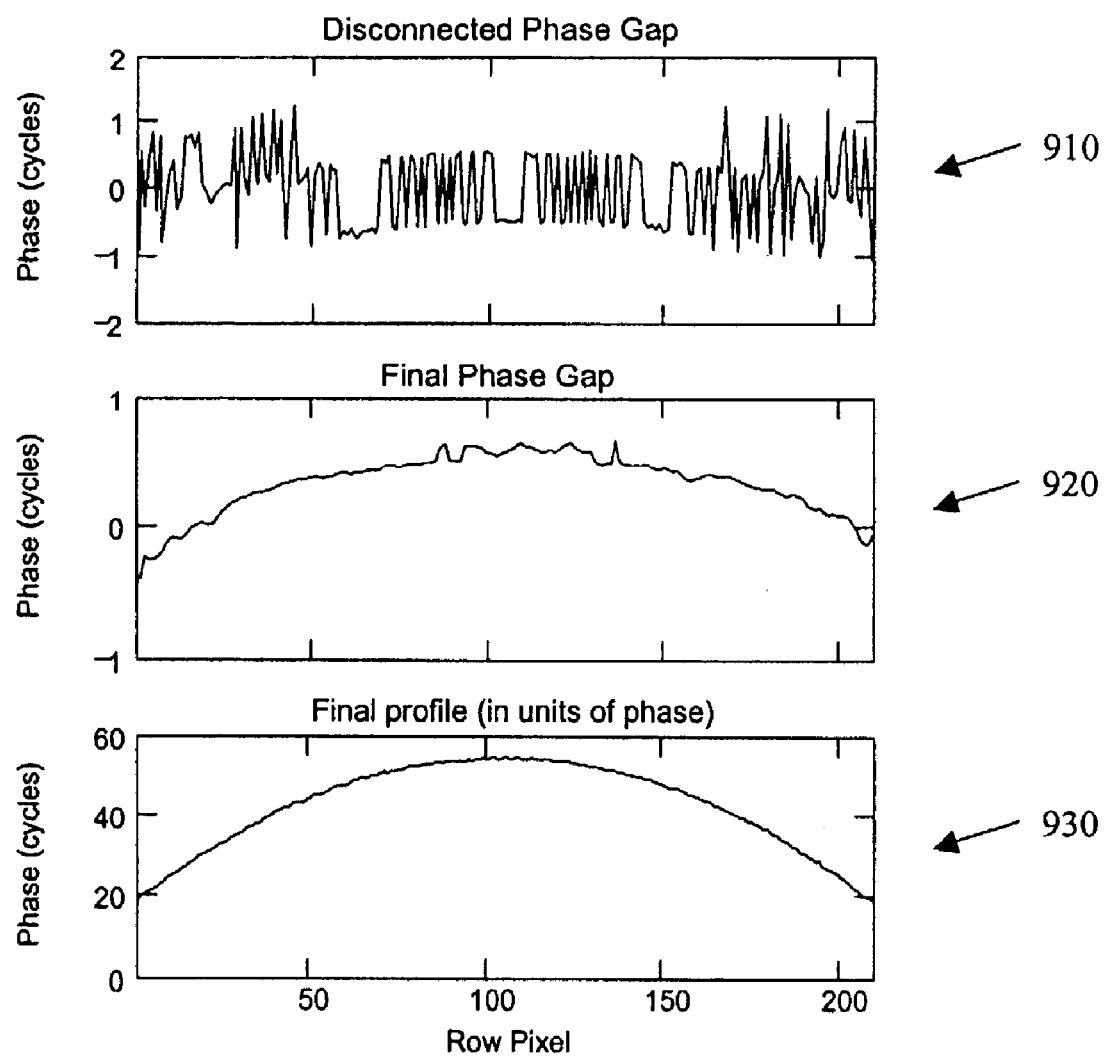
FIG. 9 is a set of plots illustrating the calculation of a height profile from interference data from a spherical surface.

As has been noted e.g. in FIG. 6, we often observe phase gap features that mimic to some degree the surface profile. This is certainly the case in the example of a sphere in FIG. 9. This is most likely the result of a coupling of the surface slope to the off-axis aberrations in the optical system, particularly chromatic aberration, which distorts the dispersion offset τ(x). If it were not for these aberrations, the phase gap should be, in the ideal case, perfectly flat regardless of the actual surface profile. In this case, however, we observe in the disconnected phase gap Γ'"(x) 910 a trend which is well approximated by a fit $\Gamma_{fit}(x)$ of the coherence profile Θ(x), as generated by Eq. (24). The fit $\Gamma_{fit}(x)$ fills in the data near the edge of the image that were lost during the connect procedure because of noise in the phase gap. The magnitude of the curvature in the final phase gap $\Gamma_{final}(x)$ 920 illustrates the importance of a more flexible phase gap analysis than using a single average value, which in this case would have led to errors in fringe order identification near the edges of the profile 930.

Figure 10:
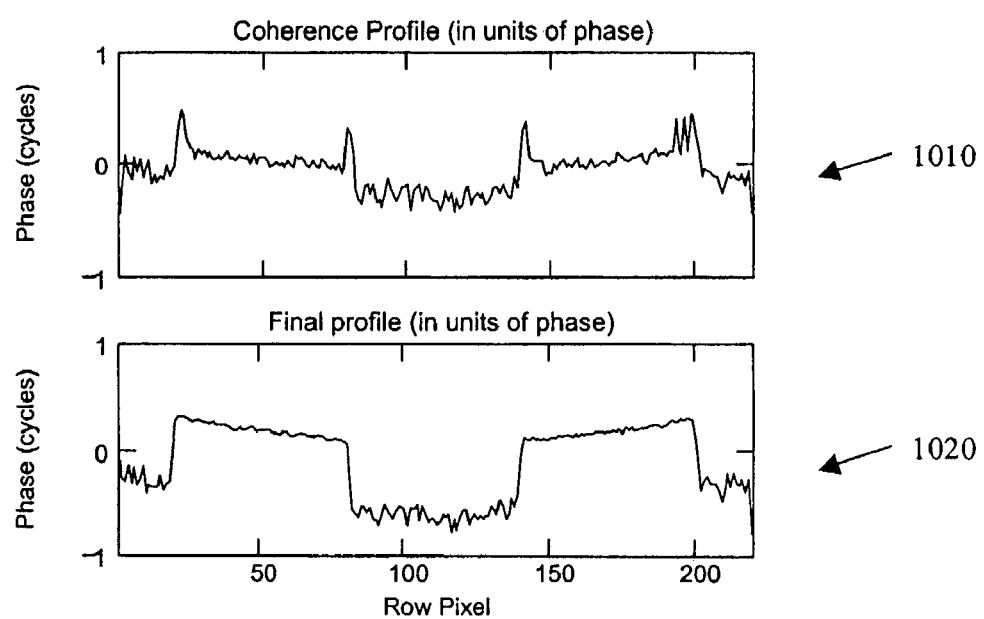
FIG. 10 is a comparison of a final height profile with a coherence profile from interference data from a patterned silicon sample.

The example of FIG. 10 comparing coherence 1010 and phase 1020 profiles for a sample having discrete features underscores three points: the significance of diffraction effects in coherence data; the improvement in noise level afforded by high-precision SWLI using phase data; and accommodation of thin film effets. The sample is patterned silicon and the sharp edges of rectangular features generate spikes. The final profile 1020 generated from phase data does not exhibit these distortions and the noise level overall is noticeably lower.

The data processing procedures described above can be applied to a large range of interferometry systems and particularly, to any height scanning interferometers. For example, the light source in the interferometer may be any of: an incandescent source, such as a halogen bulb or metal halide lamp, with or without spectral bandpass filters; a broadband laser diode; a light-emitting diode; a combination of several light sources of the same or different types; an arc lamp; any source in the visible spectral region; any source in the IR spectral region, particularly for viewing rough surfaces & applying phase profiling; any source in the UV spectral region, particularly for enhanced lateral resolution; and any source or combination of sources having a net spectral bandwidth broader than 0.1% of the mean wavelength. Furthermore, the scanning system may be: driven by any of a piezo-electric device, a stepper motor, and a voice coil; implemented opto-mechanically or opto-electronically rather than by pure translation (e.g., by using any of liquid crystals, electro-optic effects, strained fibers, and rotating waveplates); any of a driver with a flexure mount and any driver with a mechanical stage, e.g. roller bearings or air bearings. Also, the interferometer optics may form any of: an interferometric microscope employing, e.g., a Mirau or Michelson objective lens; a Twyman Green system; a Fizeau interferometer employing a filtered or structured source spectrum so as to provide coherence peaks far from zero OPD; a fiber interferometer; and a Mach Zehnder, particularly for profiling transparent media. Finally, the data analysis may involve any of: frequency domain analysis (FDA); peak-fringe analysis; dynamic filtering to extract the fringe visibility in real time; a least-squares technique to extract fringe visibility and phase at the same time; and fringe visibility analysis followed by phase analysis, potentially including a separate measurement for phase with a modified source spectrum.

The analysis steps described above can be implemented in computer programs using standard programming techniques. Such programs are designed to execute on programmable computers each comprising an electronic processor, a data storage system (including memory and/or storage elements), at least one input device, and least one output device, such as a display or printer. The program code is applied to input data (e.g., images from the camera) to perform the functions described herein and generate output information (e.g., surface profiles), which is applied to one or more output devices. Each such computer program can be implemented in a high-level procedural or object-oriented programming language, or an assembly or machine language. Furthermore, the language can be a compiled or interpreted language. Each such computer program can be stored on a computer readable storage medium (e.g., CD ROM or magnetic diskette) that when read by a computer can cause the processor in the computer to perform the analysis described herein.

Other aspects, advantages, and modifications are within the scope of the following claims.

What is claimed is:

1. A method comprising:
   providing a coherence profile and a phase profile derived from interferometry data for a test surface;
   calculating a phase gap map, wherein the phase gap map is related to a difference between the coherence profile and the phase profile;
   fitting an expression including a term based on the coherence profile to the phase gap map; and
   determining a height profile for the test surface using information derived from the fit.

2. The method of claim 1, wherein the data comprises an intensity signal I(ζ,x) produced by interfering a measurement wavefront reflected from the test surface with a reference wavefront reflected from a reference surface, where the wavefronts are derived from a common source, ζ is an optical-path difference scan position, and x is a field position corresponding to an object position on the test surface.

3. The method of claim 2, wherein the coherence profile is calculated from a localization of interference fringes in the intensity signal with respect to the optical-path difference scan position ζ.

4. The method of claim 2, wherein the coherence profile is calculated from a wavevector dependence of a phase φ of a transform of I(ζ,x) with respect to the optical-path difference scan position ζ.

5. The method of claim 4, wherein the transform is a Fourier transform.

6. The method of claim 2, wherein the phase profile is calculated from an interferometric phase of I(ζ,x) at a nominal wavevector $k_0$.

7. The method of claim 6, where in the phase profile is calculated from a phase of a transform of I(ζ,x) with respect to the optical-path difference scan position ζ at a nominal wavevector $k_0$.

8. The method of claim 7, wherein the transform is a Fourier transform.

9. The method of claim 1, wherein calculating the phase gap map comprises expressing the coherence profile and the phase profile in common units.

10. The method of claim 9, wherein the coherence profile is expressed in radians with respect to a nominal wavevector $k_0$ according to $\Theta(x)=k_0 h_C(x)$, where $h_C(x)$ is a surface height profile of the test surface derived from the coherence profile, and wherein the phase profile is calculated as the interferometric phase θ(x) in radians of the interferometry data at the nominal wavevector $k_0$.

11. The method of claim 1, wherein calculating the phase gap map comprises generating an experimental phase gap map related to the difference between the coherence profile and the phase profile and connecting $2\pi$ phase jumps in the experimental phase gap map.

12. The method of claim 11, wherein generating the experimental phase gap map comprises determining the difference between the coherence profile and the phase profile.

13. The method of claim 12, wherein generating the experimental phase gap map further comprises setting the experimental phase gap map equal to the difference between the coherence profile and the phase profile.

14. The method of claim 11, wherein generating the experimental phase gap map comprises filtering the coherence profile, and determining a difference between the phase profile and the filtered coherence profile.

15. The method of claim 14, wherein filtering the coherence profile comprises smoothing the coherence profile to round the edges in the coherence profile.

16. The method of claim 14, wherein generating the experimental phase gap map further comprises setting the experimental phase gap map equal to the difference between the phase profile and the filtered coherence profile.

17. The method of claim 11, wherein connecting $2\pi$ phase jumps in the experimental phase gap map comprises adding $2\pi$ or integer multiples thereof to at least some locations in the experimental phase gap map to reduce phase jumps.

18. The method of claim 17, wherein the connecting further comprises calculating a metric corresponding to a local variation in the experimental phase gap map at each of multiple locations, and adding $2\pi$ or integer multiples thereof to at least some locations in the experimental phase gap map based on the value of the metric.

19. The method of claim 18, wherein for each location the metric is proportional to a sum of the absolute values of differences between the experimental phase gap map at that location and at each adjacent location, wherein $2\pi$ or integer multiples thereof are added to each of the adjacent locations to minimize the sum.

20. The method of claim 18, wherein the connecting further comprises replacing the value of the experimental phase gap map at each location where the metric indicates that the local variation exceeds a threshold variation with a constant value.

21. The method of claim 20, wherein the constant value is a global average of the experimental phase gap map that is determined by calculating at least one trigonometric function for multiple locations of the experimental phase gap map, averaging the results of each trigonometric function, and calculating an inverse trigonometric function based on each trigonometric average.

22. The method of claim 11, wherein a difference between the experimental phase gap map and a theoretical phase gap map $G(x)=\gamma(x)-k_0\tau(x)$ is indicative of agreement between the coherence profile of the test surface and the phase profile of the test surface, wherein $\gamma(x)$ is a value of a phase offset at the nominal wavevector $k_0$ produced by reflections from the test surface and elements of the interferometer used to measure the interferometry data, and $\tau(x)$ is a value of linear dispersion in the phase offset with respect to wavevector.

23. The method of claim 22, further comprising determining values for $\gamma(x)$ and $\tau(x)$.

24. The method of claim 1, wherein the expression including a term based on the coherence profile comprises a superposition of the term based on the coherence profile and a plane.

25. The method of claim 24, wherein the term based on the coherence profile is the coherence profile.

26. The method of claim 24, wherein the term based on the coherence profile is selected to have surface form that matches the coherence profile.

27. The method of claim 24, wherein the plane accounts for a tip and a tilt in the orientation of the test surface.

28. The method of claim 24, wherein the expression is given by $\Gamma_{fit}(x,y)=c_0+c_1x+c_2y+c_3\Theta(x,y)$, where $\Theta(x,y)$ is an expression for the coherence profile, x and y denote profile coordinates, and the fit determines the coefficients $c_0$, $c_1$, $c_2$, and $c_3$.

29. The method of claim 28, wherein the fitting comprises using a least squares fit.

30. The method of claim 1, wherein determining the height profile comprises determining a relative fringe order profile based on the information derived from the fit and the coherence and phase profiles.

31. The method of claim 30, wherein determining the relative fringe order profile comprises determining an integer multiple of $2\pi$ nearest to a difference between the expression and an experimental phase gap map related to the difference between the coherence profile and the phase profile for each of corresponding locations in the profiles.

32. The method of claim 30, wherein determining the relative fringe order profile comprises generating an experimental phase gap map related to the difference between the coherence profile and the phase profile, calculating a metric corresponding to a local variation in the experimental phase gap map at each of multiple locations, and determining an integer multiple of $2\pi$ nearest to a difference between a revised phase gap map and the experimental phase gap map for each of the multiple locations, wherein the revised phase gap map is based on the fitted expression and a connected version of the experimental phase gap map.

33. The method of claim 32, wherein the connected version of the experimental phase gap map includes locations where $2\pi$ or integer multiples thereof are added to the experimental phase gap map to reduce phase jumps.

34. The method of claim 32, wherein for each location the metric is proportional to a sum of the absolute values of differences between the experimental phase gap map at that location and at each adjacent location, wherein $2\pi$ or integer multiples thereof are added to each of the adjacent locations to minimize the sum.

35. The method of claim 32, wherein the revised phase gap map corresponds to the connected version of the experimental phase gap map except for locations where the metric indicates that the local variation exceeds a threshold value in which case the revised phase gap map at those locations corresponds to the fitted expression.

36. The method of claim 32, wherein the revised phase gap map can be expressed as $\Gamma'_{final}(x,y)=\Gamma'_{fit}(x,y)+[\Gamma'_{fill}(x,y)-\Gamma'_{fit}(x,y)]W(x,y)$, and where $\Gamma'_{fit}(x,y)$ is the fitted expression, $\Gamma'_{fill}$ is the connected version of the experimental phase gap, $W(x,y)$ varies from $W_{min}$ to 1 according to the degree of local variation indicated by the metric, where the value of $W(x,y)$ increases as the degree of local variation decreases, and x and y denote location coordinates.

37. The method of claim 30, wherein determining the height profile further comprises determining the height profile of the test surface based on the phase profile and the relative fringe order.

38. The method of claim 1, wherein determining the height profile comprises determining an absolute fringe order profile based on the information derived from the fit, the coherence and phase profiles, and a theoretical phase gap map $G(x)=\gamma(x)-k_0\tau(x)$, where the phase profile is calculated with respect to a nominal wavevector $k_0$, $\gamma(x)$ is a value of a phase offset at the nominal wavevector $k_0$ produced by reflections from the test surface and elements of the interferometer used to measure the interferometry data, and $\tau(x)$ is a value of linear dispersion in the phase offset with respect to wavevector.

39. An interferometry system comprising:
a height-scanning interferometer which during operation measures height-scanning interferometry data for a test surface; and
an electronic processor coupled to the height-scanning interferometer, wherein during operation the electronic processor: determines a coherence profile and a phase profile from the height-scanning interferometry data; calculates a phase gap map, wherein the phase gap map is related to a difference between the coherence profile and the phase profile; fits an expression including a term based on the coherence profile to the phase gap map; and determines a height profile for the test surface using information derived from the fit.

40. A computer readable medium comprising a program that causes a processor to perform the steps of claim 1.

41. The system of claim 39, wherein the calculating of the phase gap map by the electronic processor comprises generating an experimental phase gap map related to the difference between the coherence profile and the phase profile and connecting $2\pi$ phase jumps in the experimental phase gap map.

42. The system of claim 41, wherein the generating of the experimental phase gap map by the electronic processor comprises filtering the coherence profile, and determining a difference between the phase profile and the filtered coherence profile.

43. The system of claim 41, wherein the connecting by the electronic processor further comprises calculating a metric corresponding to a local variation in the experimental phase gap map at each of multiple locations, and adding $2\pi$ or integer multiples thereof to at least some locations in the experimental phase gap map based on the value of the metric.

44. The system of claim 43, wherein the connecting by the electronic processor further comprises replacing the value of the experimental phase gap map at each location where the metric indicates that the local variation exceeds a threshold variation with a constant value.

45. The system of claim 39, wherein the expression including a term based on the coherence profile comprises a superposition of the term based on the coherence profile and a plane.

46. The system of claim 45, wherein the plane accounts for a tip and a tilt in the orientation of the test surface.

47. The system of claim 46, wherein the expression is given by $\Gamma_{fit}(x,y)=c_0+c_1 x+c_2 y+c_3\Theta(x,y)$, where $\Theta(x,y)$ is an expression for the coherence profile, x and y denote profile coordinates, and the fit determines the coefficients $c_0$, $c_1$, $c_2$, and $c_3$.

48. The system of claim 39, wherein the determining of the height profile by the electronic processor comprises determining an absolute fringe order profile based on the information derived from the fit, the coherence and phase profiles, and a theoretical phase gap map $G(x)=\gamma(x)-k_0\tau(x)$, where the phase profile is calculated with respect to a nominal wavevector $k_0$, $\gamma(x)$ is a value of a phase offset at the nominal wavevector $k_0$ produced by reflections from the test surface and elements of the interferometer used to measure the interferometry data, and $\tau(x)$ is a value of linear dispersion in the phase offset with respect to wavevector.

* * * * *

UNITED STATES PATENT AND TRADEMARK OFFICE
CERTIFICATE OF CORRECTION

PATENT NO. : 6,989,905 B2 Page 1 of 1
APPLICATION NO. : 10/429175
DATED : January 24, 2006
INVENTOR(S) : Peter De Groot It is certified that error appears in the above-identified patent and that said Letters Patent is hereby corrected as shown below:

<u>Column 16</u>
Line 54, replace "where in" with --wherein--

<u>Column 20</u>
Line 23, replace "andy" with --and y--

Signed and Sealed this

Seventh Day of November, 2006

JON W. DUDAS
*Director of the United States Patent and Trademark Office*